(12) United States Patent
Dube et al.

(10) Patent No.: US 8,239,241 B2
(45) Date of Patent: Aug. 7, 2012

(54) METHOD AND APPARATUS FOR PROVIDING INFORMATION ABOUT ANTICIPATED DELAYS TO CUSTOMERS AT SERVICE CENTERS, CONTACT CENTERS, OR CALL CENTERS

(75) Inventors: Parijat Dube, Yorktown Heights, NY (US); Zhen Liu, Tarrytown, NY (US); Laura Wynter, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 1310 days.

(21) Appl. No.: 11/511,564

(22) Filed: Aug. 29, 2006

(65) Prior Publication Data

US 2008/0069333 A1 Mar. 20, 2008

(51) Int. Cl.
*G06Q 10/00* (2012.01)
(52) U.S. Cl. .................................................. 705/7.29
(58) Field of Classification Search .................. 705/7.29
See application file for complete search history.

(56) References Cited

U.S. PATENT DOCUMENTS

| | | | |
|---|---|---|---|
| 6,023,681 A | 2/2000 | Whitt | |
| 6,064,731 A | 5/2000 | Flockhart et al. | |
| 6,519,571 B1 * | 2/2003 | Guheen et al. | 705/14.66 |
| 6,522,743 B1 * | 2/2003 | Hurd | 379/266.04 |
| 6,539,392 B1 * | 3/2003 | Rebane | 705/7.31 |
| 6,820,260 B1 * | 11/2004 | Flockhart et al. | 717/173 |
| 6,857,025 B1 | 2/2005 | Maruyama et al. | |
| 6,988,076 B2 * | 1/2006 | Ouimet | 705/7.36 |
| 7,043,004 B1 | 5/2006 | Khuc et al. | |
| 7,054,945 B2 | 5/2006 | Hurtta et al. | |
| 7,343,334 B1 * | 3/2008 | Adduci et al. | 705/36 R |
| 7,415,437 B2 * | 8/2008 | Marvin et al. | 705/37 |
| 7,526,434 B2 * | 4/2009 | Sharp | 705/7.29 |
| 2002/0042731 A1 * | 4/2002 | King et al. | 705/10 |
| 2002/0067823 A1 * | 6/2002 | Walker et al. | 379/266.01 |
| 2003/0103619 A1 * | 6/2003 | Brown et al. | 379/266.01 |
| 2003/0108162 A1 * | 6/2003 | Brown et al. | 379/88.01 |
| 2005/0209909 A1 * | 9/2005 | Dull et al. | 705/10 |

OTHER PUBLICATIONS

Mor Armony, Constantinos Maglaras, On Customer Contact Centers with a Call-Back Option: Customer Decisions, Routing Rules, and System Design, Operations Research, v.52 n. 2, p. 271-292, Mar. 2004 DOI: 10.1287/opre.1030.0088.*

Gans, Noah; Koole, Ger; Mandelbaum, Avishai, ("Telephone Call Centers: Tutorial, Review, and Research Prospects," Manufacturing Service Operations Management, Spring 2003).*

Zohar, Ety, Avishai Mandelbaum, and Nahum Shimkin. "Adaptive Behavior of Impatient Customers in Tele-Queues: Theory and Empirical Support." Management Science 48, No. 4 (Apr. 2002): 566-583. Business Source Complete, EBSCOhost (accessed Feb. 11, 2011).*

(Continued)

*Primary Examiner* — Scott L Jarrett
*Assistant Examiner* — George H Walker
(74) *Attorney, Agent, or Firm* — Gibb & Riley, LLC; William J. Stock, Esq.

(57) ABSTRACT

The present invention provides a method for providing information to a client or customer about anticipated service center delays comprising maintaining data about the client's call preferences, modeling a best indicator of delays specific to an individual client when answering a call from the client by the service center in order to capture the greatest market share of the clients, and communicating to the client a best indicator of delays suited to the client's call preferences in answering the call from the client to the service center.

15 Claims, 4 Drawing Sheets

OTHER PUBLICATIONS

Dan Merriman.The Total Economic Impact™ of Virtual Hold's Virtual Queuing Solutions, forrester Research Jun. 2006.*

Tom, Gail; Burns, Michael; & Zeng, Yvette. "Your Life on Hold: The Effect of Waiting Time on Consumer Perception," Journal of Direct Marketing, 11 (1997) 25-31.*

DeHaan, Peter. "Call Center Benchmarking: A Path to Self-Improvement." answerstat.com, Fall, 2004.*

Mor Armony, Constantinos Maglaras, "Contact Centers with a Call-Back Option and Real-Time Delay Information," Operations Research, v.52 n. 4, p. 527-545, Jul.-Aug. 2004 DOI: 10.1287/opre.1040.0123.*

Michael K. Hui, David K. Tse, "What to Tell Consumers in Waits of Different Lengths: An Integrative Model of Service Evaluation," The Journal of Marketing, vol. 60, No. 2 (Apr. 1996), pp. 81-90.*

Ward Whitt, "Improving Service by Informing Customers About Anticipated Delays". Management Science, vol. 45, No. 2, Feb. 1999, pp. 192-207.

Ward Whitt, "Predicting Queueing Delays". Managements Science, vol. 45, No. 6, Jun. 1999, pp. 870-888.

\* cited by examiner

METHOD AND APPARATUS FOR PROVIDING INFORMATION ABOUT ANTICIPATED DELAYS TO CUSTOMERS AT SERVICE CENTERS, CONTACT CENTERS, OR CALL CENTERS

BACKGROUND

1. Field of the Invention

The embodiments of the invention generally relate to improving satisfaction at service centers, contact centers, or call centers, through conveying waiting time or delay information to customers.

2. Description of the Related Art

Contact centers, or call centers, have become an increasingly important part of running many businesses. Contact centers have been primarily used for technical support and for billing questions. They are also often used for sales and marketing purposes, as well as resolving problems with products and services and billing issues. When calls are routed to contact centers for technical or billing problems, the contact center employees may perform up-sell and cross-sell functions to make sales and gain additional revenue from a captive consumer. Service centers are a general term for facilities where customers wait to be served, and can include service or call centers as well as facilities such as banks, restaurants, etc. We shall use the term service centers henceforth to include all such facilities mentioned herein.

As such, increasing efficiency of service centers has become a source of intense work. Efficiency may be increased by performing optimal call routing and addressing staffing issues in the service centers. In addition, staffing is often modifiable only over a longer time frame, e.g., several months, due to the time intensive nature of training new or redeployed personnel.

U.S. Pat. No. 6,522,743, herein incorporated by reference, discloses a call routing system and method. U.S. Pat. No. 7,043,004, herein incorporated by reference discloses a call processing system to handle and route calls made to a call center. U.S. Pat. No. 6,064,731, herein incorporated by reference, discloses a method for improving retention of call center customers.

SUMMARY

In view of the foregoing, an embodiment of the invention provides a method for providing the appropriate type of information to a client (e.g., customer) about anticipated service center delays comprising calculating an indicator of delay before a call from the client to the service center is answered wherein the indicator of delay is suited to the client based on some information about the call or the client profile, communicating to the client a best indicator of delays suited to the client's call preferences in answering the call from the client to the service center. In many cases, optimized routing cannot eliminate delays for the customer, and an increase in staffing is not possible. Hence, the invention described herein comprises a additional methods to improve customer satisfaction. The present invention method provides for an appropriate information about the anticipated delay or waiting time to be experienced by the customer. "Appropriate" measure of delay to be conveyed to the customers will be understood to those of skill in the art as described further herein. The information helps a service center maintain customers in the queue rather than have then leave the queue due to dissatisfaction with the waiting time or delays that they experience.

In another embodiment, the invention further comprises maintaining data about the customer's call preferences, modeling a client profile specific to a customer or customer class based on the data in order to provide a better information about anticipated waiting time or delays to the customer.

In another embodiment, the customer class or customer-specific data can be enhanced with information about client's waiting time behavior to improve the routing of the call to service center representatives. The waiting time behavior can have elements for client's sensitivity to different metrics for anticipated delay information.

In another embodiment, the choice of information about waiting time or anticipated delays to provide to the customer can be one or more of the following: static information about the expected waiting time calculated offline, dynamic information about the expected waiting time (where the expected waiting time may be updated in real-time using e.g., a smoothing technique), static information about the number of clients in front of the customers waiting for the service at the particular agent to which the customer is routed to, dynamic information about the number of clients in front of the customers, other delay mean and variance information about waiting time, mean and variance information about the queue length a probabilistic guarantee to a customer on the actual waiting time, and/or absolute delay guarantees, like the actual delay of the customer will be less than some value. These different delay indicators have different degree of information about the actual delay that the customer will eventually experience and hence have different value to the customers in their decision making process.

In yet another embodiment, the modeling comprises analyzing the data collected about the client to establish a client profile to determine the client's waiting pattern to be potentially used in improving chances of sales of products or services.

In yet another embodiment of the invention, the modeling comprises analyzing the data collected to establish the client profile to determine client call duration patterns in calls from the customer to the service center.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which.

DETAILED DESCRIPTION OF PREFERRED EMBODIMENTS

Figure 1:
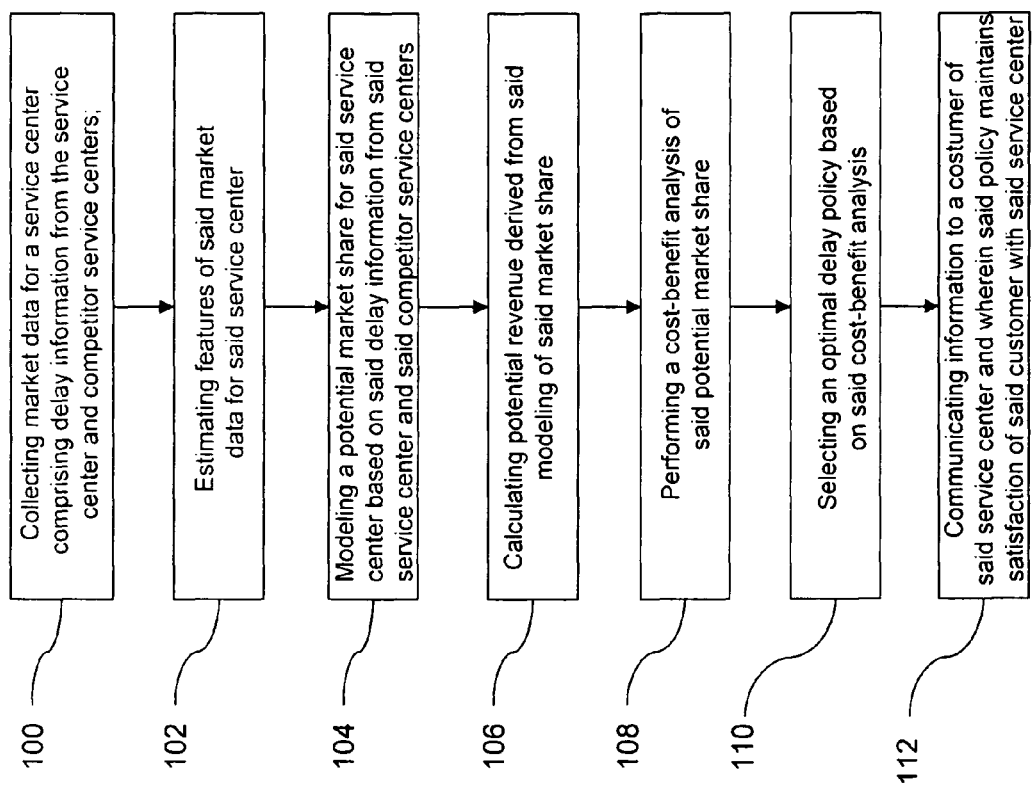
FIG. 1 is a flow diagram illustrating a preferred method of an embodiment of the invention.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

As mentioned, there remains a need for increases in the efficiency of service center providing technical or billing support to clients or customers. The embodiments of the invention achieve this by providing a method for providing information to a client about anticipated service center delays that are tailored to the client's preferences.

A primary source of customer satisfaction or dissatisfaction at a service center is the amount of time that a customer is forced to wait until a service center employee or agent, responds to the call. The information provided to the waiting customer is hence critical to the satisfaction of the customer with the call being made. Since a satisfied customer is a return customer, and one to whom cross-sell and up-sell possibilities are open, the satisfaction level of a customer at a service center is vital to the firm's revenue. In addition, service centers are rated and paid based on the level of satisfaction that customers declare on average, according to survey results.

The present method involves determining the type of information that a firm should provide to its service center customers/clients regarding the delay or wait time that they will experience. Each type of information has its own cost, based on the complexity of data collection and computation, associated with it, and its own benefit regarding customer satisfaction. For example, providing real-time updated expected delay information would be more complex to compute than static, offline calculated expected delay information, but may provide more relevant and accurate information to a customer. Static average delay is the least costly but also the least precise from a customer's point of view. Several intermediate measures of delay with intermediate levels of accuracy and complexity of calculation also exist.

The invention provides the methodology and system by which a firm can determine the measure of delay, or wait time, which provides the best benefit-to-cost ratio. The method can handle a market with multiple firms competing for customers, in which case the choice of best measure or best indicator of delay takes into account the market share that the firm could intend to achieve and the cost it must outlay to get it.

Figure 2:
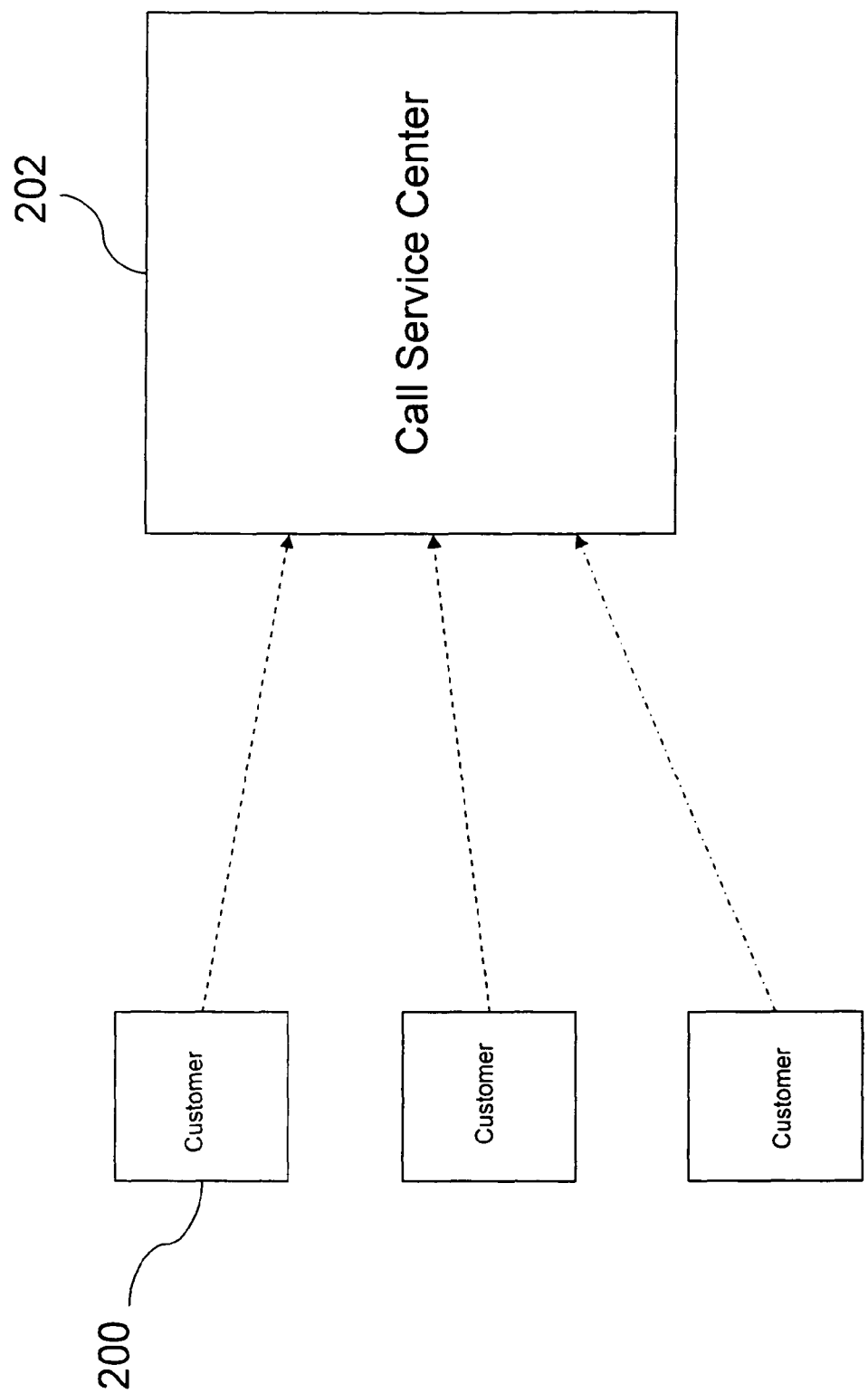
FIG. 2 illustrates a schematic diagram of call center and clients communication.
Figure 3:
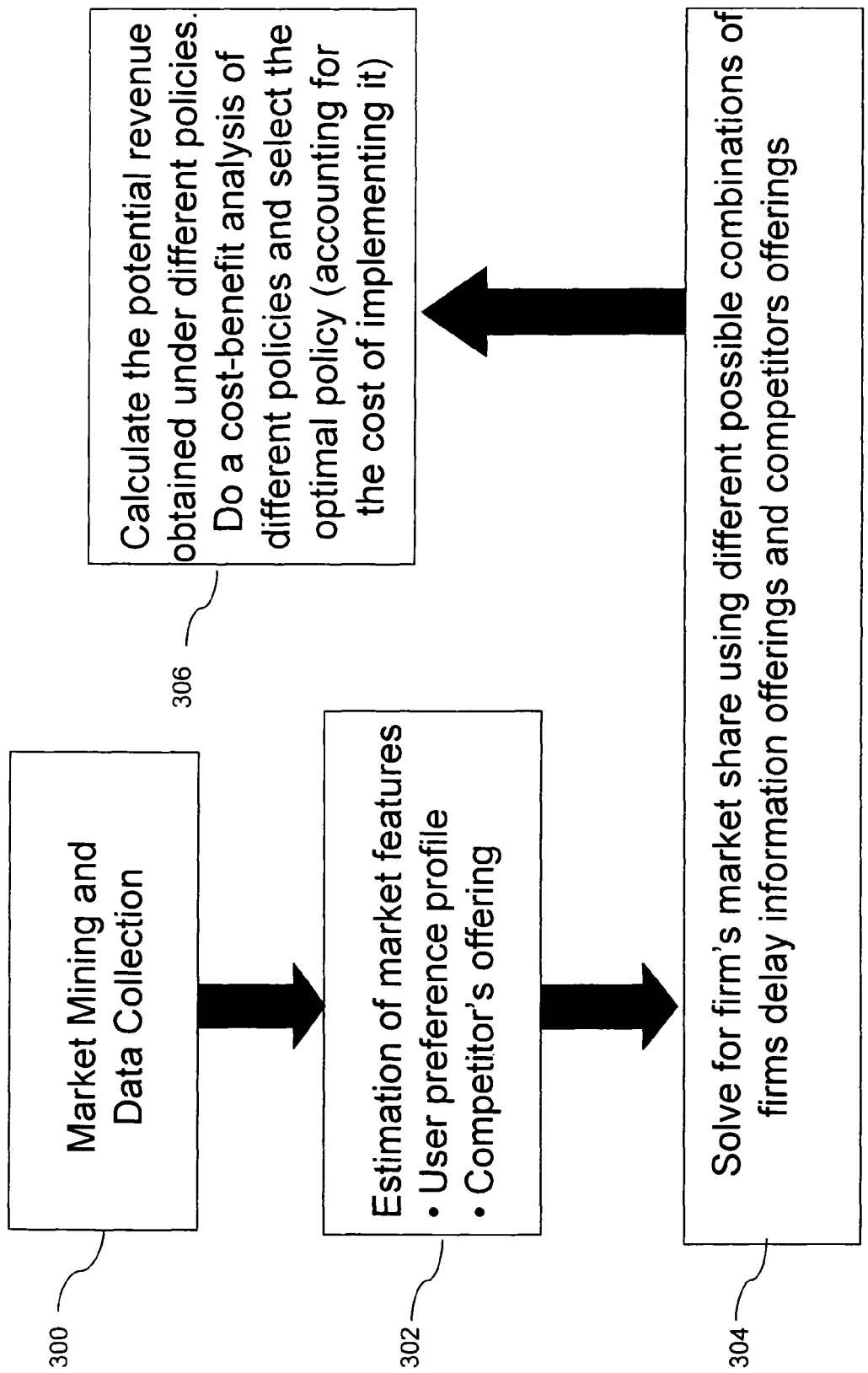
FIG. 3 is a flow diagram illustrating a second preferred method of an embodiment of the invention in which a firm decides on the appropriate delay information to be conveyed to customers taking into account the competitor's offerings.

Referring now to the drawings, and more particularly to FIGS. 1 through 3, where similar reference characters denote corresponding features consistently throughout the figures, there are shown preferred embodiments of the invention.

FIG. 1 illustrates a flow diagram depicting the method for handling customers experiencing service center (or call center) delays comprising collecting market data for a service center comprising delay information from said service center and competitor service centers (100). The data may include but is not limited to parameters such as the economic characteristics of the client; age of the client; education of the client; geographical location of the client; purchasing patterns of the client; length of time of previous calls from the client; additional transactions completed during the previous calls; previous purchases of the client; list of the clients served by the service center; a list of the service centers; a price of goods or services supported by the service center; a call capacity of the service center; a list of competing service centers; and delays of calls made to the competing service center.

The method also includes a step comprising estimating features of said market data for said service center, which in this embodiment, was defined so as to capture the greatest market share of the clients (102), modeling a potential market share for said service center based on said delay information from said service center and said competitor service centers (104), calculating potential revenue derived from said modeling of said market share (106), and performing a cost-benefit analysis of said potential market share (108); selecting an optimal delay policy based on said cost-benefit analysis (110); and communicating information to a customer of said service center and wherein said policy maintains satisfaction of said customer with said service center (112).

In yet another embodiment, a greater market share of a first predetermined value market is captured as compared to a market share of a second predetermined value market. The first predetermined value market comprises first clients of predetermined value products and the second predetermined value market comprises second clients of products of lower value than the predetermined value products. The predetermined value products comprise products having a profit margin per unit that is greater than the profit margin per unit of the products of lower value. Moreover, the predetermined value products comprise products having aggregate sales that are greater than the aggregate sales of the products of lower value.

In another embodiment, the step further comprises taking calls from first clients of predetermined value products before second clients of products of lower value than the predetermine value products until an average waiting time of calls from the first clients is less than the average waiting time of calls from the second clients.

The modeling step takes into account what kind of information about waiting time a particular client would prefer based on data compiled on call preferences for the client. After analyzing those call preferences, it is determined what a best indicator of a delay would be for the client. An indicator for clients may include: the actual length of time for a call to be answered; an average length of time before the call is answered by a representative of the service center; the number of callers waiting in the queue; a combination of the foregoing or another indicator entirely.

By analyzing and modeling for what a client's preferences are, the client may be more likely to wait for a representative to the call center, and thus, possibly increase the service center's market share and increase the opportunity to sell additional services or products to the client. The modeling comprises analyzing the data to establish a client profile to determine a client waiting pattern. The modeling of a client profile also comprises analyzing the data, described herein, to establish a client profile to determine client call duration patterns in answering the calls from the clients to the service center.

In another embodiment of the invention the method also includes the appropriate routing of the call to the service center (108) call based on the modeling of the client profile, its waiting time patterns, value the client assigns to different indicator about waiting times in his decision making process, and the sensitivity of the client to the exactness of the difference between promised delay and the actual delay.

In yet another embodiment of the invention, multiple call centers for a particular company are analyzed, information communicated and calls appropriately routed in the present method.

In another embodiment of the invention, the modeling for a waiting time or anticipated delay indicator that involves a consideration of competing service centers and the market for and service center delays for the competing service centers. This aspect of the invention allows for additional ways to maximize market share by identifying competitor behavior.

FIG. 2 illustrates a schematic diagram of call center and clients communication. Other embodiments of the invention include: a service for providing information to a customer about call center delays as set forth in the discussion herein and a computer program product readable by machine tangibly embodying a program of instructions executable by the machine to perform a method for providing information regarding service center wait time or delays to clients.

The method in its most general form makes use of a model of the market, its customers, and the service centers of each firm in the market. It explicitly models the relation between the measure of delay that the customer is informed, the delay it actually experiences, and the characteristics of the product or service that the firms in the market sell. Through this framework, the expected market share of each firm can be computed, as a function of the measure of delay, and the delay that they offer.

More particularly, a firm operating a service center maintains data about the calls into the service center and can obtain, through data mining on call logs, preference measures about its clientele. Depending upon the services the firm offers and the type of clientele that they have, their best choice of delay measures conveyed to their customers/class of customers will vary. This choice can be modeled and optimized for the firm from the point of view of capturing the most market share. Parameters about the firm and its competitors may include: the measure of information about delay advertised by competitors' service centers; the price of the principal good or service offered by each firm; and the "operating" capacity of the service centers, for example. The "operating" capacity of a firm is a measure of its resources to handle a particular service and in particular of those resources which are bottleneck. For example, this can be the physical bandwidth of the CPU in case of e-services hosted by web servers.

FIG. 3. shows a flow diagram of the decision process of the firm about the most efficient choice of the delay indicator to be conveyed to its customers when those customers call a service center. The firm does some analysis using the approach described herein to arrive at an appropriate delay metric. The analysis process can be automated, done offline at regular intervals or can be implemented as a real-time system. The analysis includes market mining and data collection (300); the estimation of market features including a customer's preference profile (302) (the preference profile includes such demographic information including but not limited to the historical tolerance of the customer to being on hold with a service center, the estimated tolerance based on the customers demographic profile, purchase characteristics, age, income, etc.); solving for the firms market share using different possible combinations of the service center's delay information and competitors delay information (304); and calculating the potential revenue obtained under different policies (306).

The present invention offers the framework to perform the above analysis and determine a good indicator of delay for the customer. One possible embodiment of the invention can be considering a market that has two competing firms providing the same product/service, a first firm and a second firm. In a situation where the first firm's service center advertises some measure about the expected delay and the second firm advertises the exact number N of customers, let $\Delta$ be the expected delay information conveyed by the first firm and N be the number of customers at the second firm indicated to a newly waiting customer. A customer can be characterized by a particular value of the variable $\alpha_i$ that models the per unit value he assigns to the delay indicator from firm i. The value of the variable depends on the type of indicator, the profile of the firm, the customer's prior experience with the firm's service center etc. A customer will normally prefer a firm which minimizes the (dis)utility the customer obtains from the normalized value of the delay indicator i.e., if $U_1(\alpha_1\Delta) \leq U_2(\alpha_2 N)$, the customer shall prefer the first firm and otherwise prefer the second firm. Alternatively, the customer prefers firm one if the value of $\Delta$ and N conveyed to him by the two firms are such that $$N \geq \frac{U_2^{-1}(U_1(\alpha_1\Delta))}{\alpha_2}.$$

For the special case where the utility is modeled by a simple linear function, an arriving customer preferring firm 1 if he observes N and $\Delta$ such that:

$$N \geq \left\lceil \frac{\mu}{\alpha_1} \alpha_2 \Delta \right\rceil,$$

where $\mu^{-1}$ is the mean service time of a customer. Let us Define $$N_\Delta^* \equiv \left\lceil \frac{\mu}{\alpha_1} \alpha_2 \Delta \right\rceil.$$

If $\Delta$ is a fixed static quantity, then so is $N^*_\Delta$.

Let $\lambda$ be the size of the market in terms of the mean arrival rate of customers to the two firms' service centers. Then the fraction of arriving customers that prefer firm 1 advertising expected delay is $\lambda P(N=N^*_\Delta)$ and the market share of firm 2 advertising the number of customers in front of the arriving customer in the service queue is $\lambda P(N<N^*_\Delta)$ Results from queuing theory follows:

$$P(N = N_\Delta^*) = \frac{\left(\frac{\lambda}{\mu c_2}\right)^{N^*}}{1 + \sum_{N=1}^{N^*} \left(\frac{\lambda}{\mu c_2}\right)^N} = 1 - P(N < N_\Delta^*), \quad (1)$$

where $c_i$ is the operating capacity of firm i. The notion of capacity is explicit in terms of e-services where it refers to the capacity of the web server hosting the service. In other domains, like banking, it can refer to the number of service agents working in parallel like tellers etc. Thus higher the capacity the lower is the waiting time of customers. Further:

$$\Delta = \frac{1}{\mu c_1 - \lambda P(N = N_\Delta^*)}. \quad (2)$$

From (1) and (2) we can solve for $\Delta$ and hence obtain $N^*_\Delta$. The market share of the firm as a function of the delay indicator $\Delta$, firms' capacities $c_i$, the user preferences $\alpha_i$ and other market parameters can be obtained.

Figure 4:
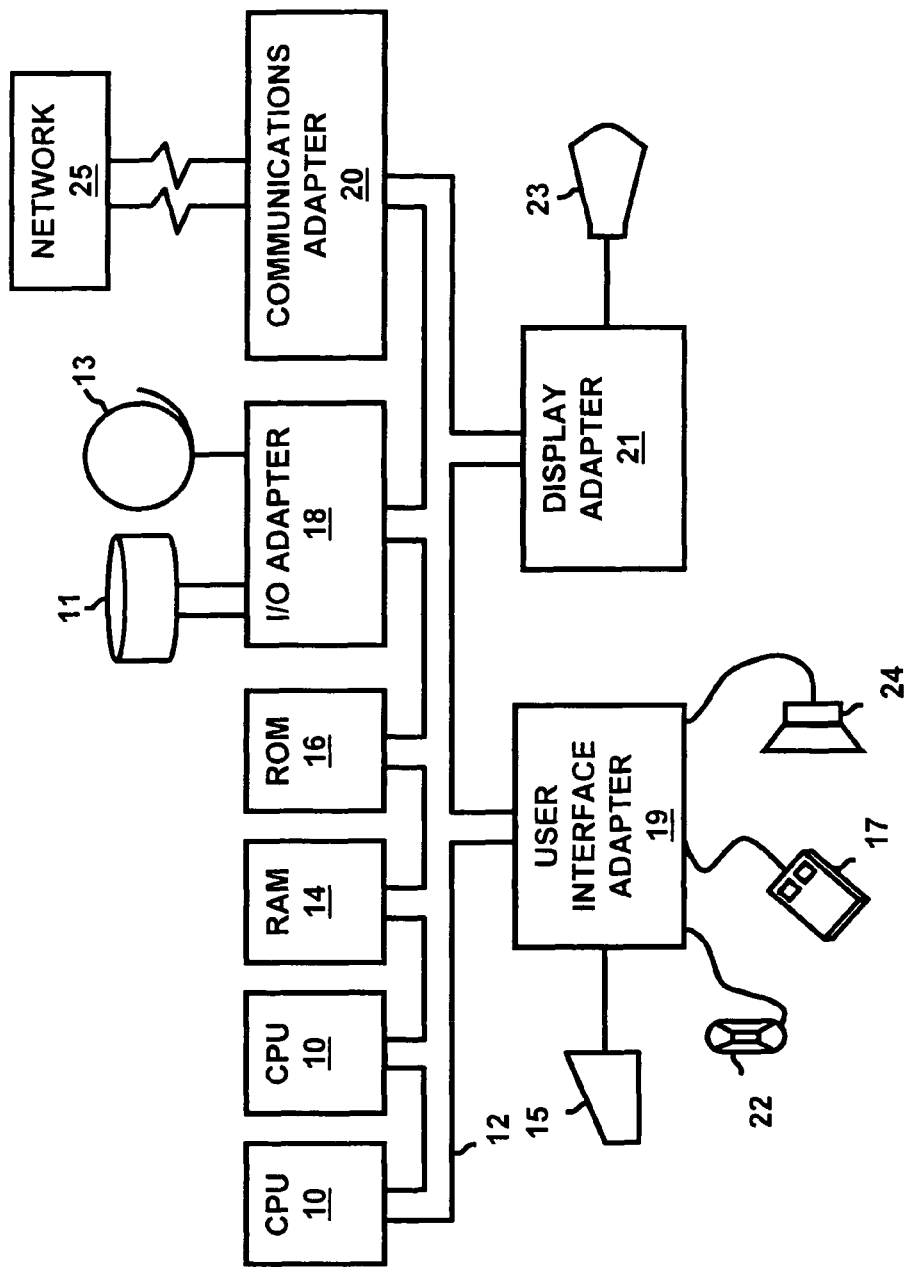
FIG. 4 illustrates a representative hardware configuration of an information handling/computer system in accordance with the embodiments of the invention.

FIG. 4 illustrates a schematic diagram according to an embodiment of the invention. The embodiments of the invention can take the form of an entirely hardware embodiment, an entirely software embodiment or an embodiment including both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments of the invention is depicted in FIG. 4. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the invention have been described in terms of preferred embodiments, those skilled in the art will recognize that the embodiments of the invention can be practiced with modification within the spirit and scope of the appended claims.

What is claimed is:

1. A computer-implemented method for improving a service center's handling of a newly waiting customer experiencing delays comprising:

collecting, by a computer, market data comprising delay information from a first firm's service center and a second competing firm,
wherein said delay information includes a first indicator of delay for said first firm's service center and a second indicator of delay for said second competing firm, and
wherein said first firm's service center advertises a measure of expected delay, as said first indicator of delay, said measure of expected delay including real-time updated expected delay and static average delay, and said second firm advertises an exact number of customers, as said second indicator of delay;

estimating, by said computer, features of said market data, including historical tolerance of said newly waiting customer to being on hold with said first firm's service center;

modeling, by said computer, a potential market share for said first firm's service center based on combinations of said delay information including said real-time updated expected delay and said static average delay from said first firm's service center, and said delay information of an advertised exact number of customers from said second competing center firm;

calculating, by said computer, potential revenue derived from said modeling of said potential market share based on said combinations of said delay information including said real-time updated expected delay and said static average delay from said first firm's service center and said advertised exact number of customers from said second competing center firm;

performing, by said computer, a cost-benefit analysis of said potential market share based on costs of obtaining said combinations of said delay information including said real-time updated expected delay and said static average delay from said first firm's service center and said advertised exact number of customers from said second competing center firm, and said potential revenue;

selecting, by said computer, one of said combinations of said delay information being one of: said real-time updated expected delay from said first firm's service center and said advertised exact number of customers from said second competing center firm, and said static average delay from said first firm's service center and said advertised exact number of customers from said second competing center firm based on said cost-benefit analysis; and communicating, by said computer, said one of said combinations of said delay information that is selected to said newly waiting customer of said first firm's service center based on said selecting of said one of said combinations of said delay information.

2. The method of claim 1, wherein said one of said combinations of said delay information maintains satisfaction of said newly waiting customer with said first firm's service center.

3. The method of claim 1, wherein said selecting said one of said combinations of said delay information further comprises accounting for a cost of implementation of said one of said combinations of said delay information.

4. The method of claim 1, wherein said performing said cost-benefit analysis further comprises comparing said potential revenue from a first market share and said potential revenue from at least one additional predetermined value market share.

5. A computer-implemented method for improving handling of arriving customers experiencing delays comprising:

collecting, by a computer, market data comprising delay information from a first firm's service center and a second firm's service center,
wherein said delay information includes a first indicator of delay for said first firm's service center and a second indicator of delay for said second firm's service center, and
wherein said first firm's service center advertises a measure of expected delay, as said first indicator of delay, said measure of expected delay including real-time updated expected delay and static average delay, and said second firm advertises an exact number of customers, as said second indicator of delay;

estimating, by said computer, features of said market data, including historical tolerance of said arriving customers to being on hold with said first firm's service center;

modeling, by said computer, a potential market share for said first firm's service center based on combinations of said delay information including said real-time updated expected delay and said static average delay from said first firm's service center, and said delay information of an advertised exact number of customers from said second competing center firm;

calculating, by said computer, potential revenue derived from said modeling of said potential market share based on said combinations of said delay information including said real-time updated expected delay and said static average delay from said first firm's service center and said advertised exact number of customers from said second competing center firm;

performing, by said computer, a cost-benefit analysis of said potential market share based on costs of obtaining said combinations of said delay information including said real-time updated expected delay and said static average delay from said first firm's service center and said advertised exact number of customers from said second competing center firm, and said potential revenue;

selecting, by said computer, one of said combinations of said delay information being one of: said real-time updated expected delay from said first firm's service center and said advertised exact number of customers from said second competing center firm, and said static average delay from said first firm's service center and said advertised exact number of customers from said second competing center firm based on said cost-benefit analysis; and communicating, by said computer, said one of said combinations of said delay information that is selected to said newly waiting customer of said first firm's service center based on said selecting of said one of said combinations of said delay information and wherein said one of said combinations of said delay information maintains satisfaction of said arriving customers of said first firm's service center.

6. The method of claim 5, wherein said selecting said one of said combinations of said delay information further comprises accounting for a cost of implementation of said one of said combinations of said delay information.

7. The method of claim 5, wherein said performing said cost-benefit analysis further comprises comparing said potential revenue from a first market share and said potential revenue from at least one additional predetermined value market share.

8. The method of claim 5, wherein said communicating of said policy to said arriving customers further comprises relating said policy in response to a phone call to said service center from said customer.

9. A computer-implemented method for improving a service center's handling of a newly waiting customer experiencing delay comprising:

collecting, by a computer, market data comprising delay information from a first firm's service center and a second competing firm,
wherein said delay information comprises a first indicator of delay for said first firm's service center and a second indicator of delay for said second competing firm, and
wherein said first firm's service center advertises a measure of expected delay, as said first indicator of delay, said measure of expected delay including real-time updated expected delay and static average delay, and said second firm advertises an exact number of customers, as said second indicator of delay;

estimating, by said computer, features of said market data, including historical tolerance of said newly waiting customer to being on hold with said first firm's service center;

modeling, by said computer, a potential market share for said first firm's service center based on combinations of said delay information including said real-time updated expected delay and said static average delay from said first firm's service center, and said delay information of an advertised exact number of customers from said second competing center firm;

calculating, by said computer, potential revenue derived from said modeling of said potential market share based on said combinations of said delay information including said real-time updated expected delay and said static average delay from said first firm's service center and said advertised exact number of customers from said second competing center firm;

performing, by said computer, a cost-benefit analysis of said potential market share based on costs of obtaining said combinations of said delay information including said real-time updated expected delay and said static average delay from said first firm's service center and said advertised exact number of customers from said second competing center firm, and said potential revenue; and selecting, by said computer, one of said combinations of said delay information being one of: said real-time updated expected delay from said first firm's service center and said advertised exact number of customers from said second competing center firm, and said static average delay from said first firm's service center and said advertised exact number of customers from said second competing center firm based on said cost-benefit analysis, wherein said selecting one of said combinations of said delay information further comprises communicating said one of said combinations of said delay information that is selected to said newly waiting customer of said first firm's service center based on said selecting of said one of said combinations of said delay information, and wherein said one of said combinations of said delay information maintains a satisfaction of said newly waiting customer with said first firm's service center.

10. The method of claim 9, wherein said collecting further comprises quantifying a sensitivity of a customer to a delay experience by analyzing a feature selected from one of specific purchase patterns of said newly waiting customer and said satisfaction of said newly waiting customer.

11. The method of claim 9, wherein said selecting said one of said combinations of said delay information further comprises accounting for a cost of implementation of said.

12. The method of claim 9, wherein said performing said cost-benefit analysis further comprises comparing said potential revenue from a first market share and said potential revenue from at least one additional predetermined value market share.

13. A non-transitory computer program storage medium readable by a computer, tangibly embodying a program of instructions executable by said computer to perform a method for handling of a newly waiting customer experiencing delay to a first firm's service center, said method comprising:

collecting market data comprising delay information from a first firm's service center and a second competing firm, wherein said delay information comprises a first indicator of delay for said first firm's service center and a second indicator of delay for said second competing firm, and wherein said first firm's service center advertises a measure of expected delay, as said first indicator of delay, said measure of expected delay including real-time updated expected delay and static average delay, and said second firm advertises an exact number of customers, as said second indicator of delay;

estimating features of said market data, including historical tolerance of said newly waiting customer to being on hold with said first firm's service center;

modeling a potential market share for said first firm's service center based on combinations of said delay information including said real-time updated expected delay and said static average delay from said first firm's service center, and said delay information of an advertised exact number of customers from said second competing center firm;

calculating, by said computer, potential revenue derived from said modeling of said potential market share based on said combinations of said delay information including said real-time updated expected delay and said static average delay from said first firm's service center and said advertised exact number of customers from said second competing center firm;

performing, by said computer, a cost-benefit analysis of said potential market share based on costs of obtaining said combinations of said delay information including said real-time updated expected delay and said static average delay from said first firm's service center and said advertised exact number of customers from said second competing center firm, and said potential revenue;

selecting, by said computer, one of said combinations of said delay information being one of: said real-time updated expected delay from said first firm's service center and said advertised exact number of customers from said second competing center firm, and said static average delay from said first firm's service center and said advertised exact number of customers from said second competing center firm based on said cost-benefit analysis, and wherein said said one of said combinations of said delay information that is selected maintains a satisfaction of said newly waiting customer with said first firm's service center.

14. The method of claim 13, wherein said selecting said one of said combinations of said delay information further comprises accounting for a cost of implementation of said one of said combinations of said delay information.

15. The method of claim 13, wherein said collecting further comprises quantifying a sensitivity of a customer to a delay experience by analyzing a feature selected from one of specific purchase patterns of said newly waiting customer and said satisfaction of said newly waiting customer.

* * * * *